Sept. 5, 1961 W. L. MARTIN 2,999,196
CONTOUR FOLLOWING MACHINE
Filed Aug. 12, 1957 4 Sheets-Sheet 1

INVENTOR.
WENDELL L. MARTIN
BY Bosworth, Sessions,
Herestrom & Knowles
ATTORNEYS.

Sept. 5, 1961 W. L. MARTIN 2,999,196
CONTOUR FOLLOWING MACHINE
Filed Aug. 12, 1957 4 Sheets-Sheet 2

INVENTOR.
WENDELL L. MARTIN
BY Bosworth, Sessions,
Herstrom & Knowles
ATTORNEYS.

INVENTOR.
WENDELL L. MARTIN
BY Bosworth, Sessions,
Herrström & Knowles
ATTORNEYS.

United States Patent Office 2,999,196
Patented Sept. 5, 1961

2,999,196
CONTOUR FOLLOWING MACHINE
Wendell L. Martin, Pepper Pike Village, Ohio, assignor to The Martin Brothers Electric Company, Cleveland, Ohio, a corporation of Ohio
Filed Aug. 12, 1957, Ser. No. 677,599
9 Claims. (Cl. 318—28)

This invention relates to contour following apparatus and particularly to apparatus comprising a tracer adapted automatically to follow a contour or pattern, the motion of the tracer being transmitted to a tool such as a cutting torch, for example, which is constrained to follow the same path as the tracer, thereby to reproduce the contour or pattern.

Tracing devices of this character are known in the art. See, for example, my prior Patent No. 2,678,496. Apparatus of the general type to which the present invention relates include a pattern following device or tracer arranged so that slight deviations of the axis of the tracer from a predetermined relationship with the pattern result in the production of correcting electrical signals; these signals are utilized to control the path taken by the tracer and by the torch or other cutting tools in such a manner as to correct the deviation and thereby cause the apparatus to follow the pattern.

The present invention relates particularly to a mechanism for driving a tracer and torch or other cutting tool around a pattern in response to the signal produced by the tracer, although the tracer and associated components also are included in the combination of elements making up the apparatus as a whole. In the preferred form of apparatus illustrated in my said patent the driving function is carried out by a drive wheel that frictionally engages a flat surface that supports the pattern. The drive wheel is steered by a steering motor in response to signals derived from the tracer and thus carries the tracer around the pattern. In this preferred apparatus, the tracer is mounted on the shaft of the steering motor and thus the tracer is also steered to maintain a substantially constant angular relationship between the tracer and a line tangent to the edge of the pattern at any given instant. This apparatus has been used with great success, but where the torch-carrying apparatus is large and massive and particularly in instances where the drive wheel must run on and off of the pattern, the single-motor friction drive has not been entirely satisfactory.

Accordingly, an object of the present invention is the provision of a contour reproducing machine particularly adapted to large machines embodying parts of substantial mass such as are required for the reproduction of large patterns or the reproduction of a plurality of patterns in a single operation. Another object is the provision of a contour reproducing machine in which no contact is required between a driving wheel or the like and the pattern.

Another object of the invention is the provision of a contour reproducing machine which is adapted to operate rapidly and accurately to reproduce a pattern or contour and in which the drive is accomplished without necessarily requiring any friction elements, i.e., in which the drive may be carried out entirely through positive drive elements.

A more specific object is the provision of a contour following apparatus in which the signals produced by the tracer are electrically resolved into components at right angles to each other or, in other words, the sine and cosine components of the signals; and these components are used to control the operation of two motors for driving the carriage on which the tracer and the cutting tool are mounted, one motor driving the carriage in what may be called the north and south directions, and the other motor driving the carriage in the east and west directions. Another object is the provision of comparatively simple and efficient electrical circuits which give accurate control of the speed and path of the tracer around the desired pattern.

Further objects and advantages of the invention will become apparent from the following description of a preferred form thereof, reference being made to the accompanying drawings in which.

Figure 1:
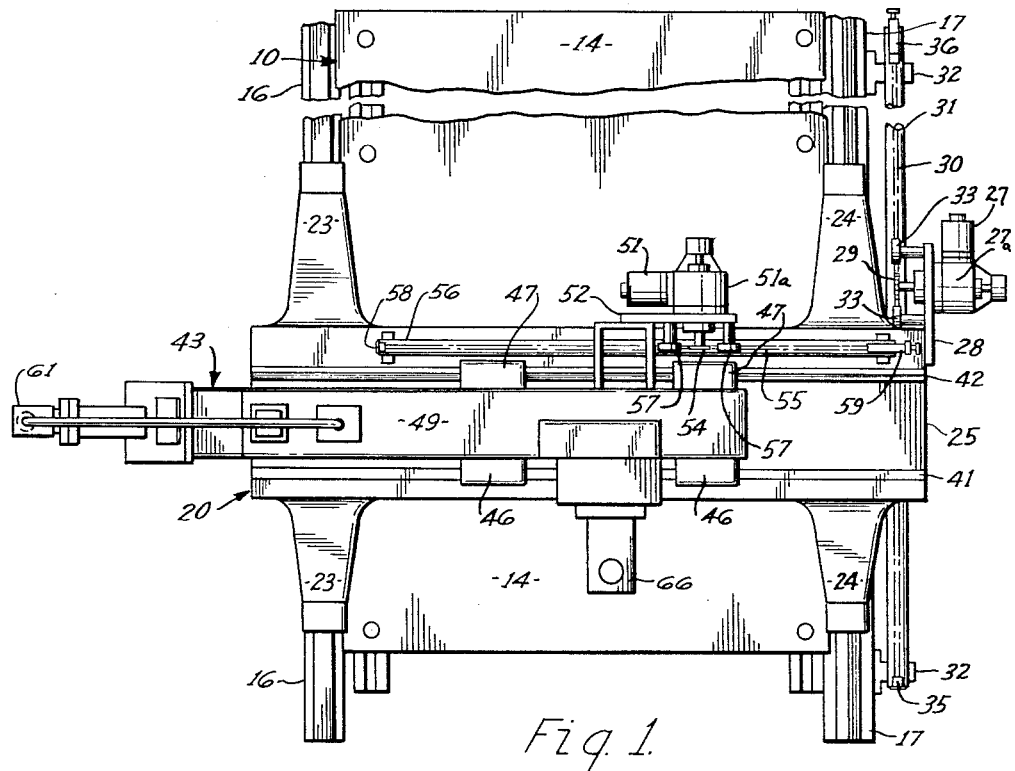
FIGURE 1 is a plan view showing a preferred form of apparatus embodying the invention.
Figure 2:
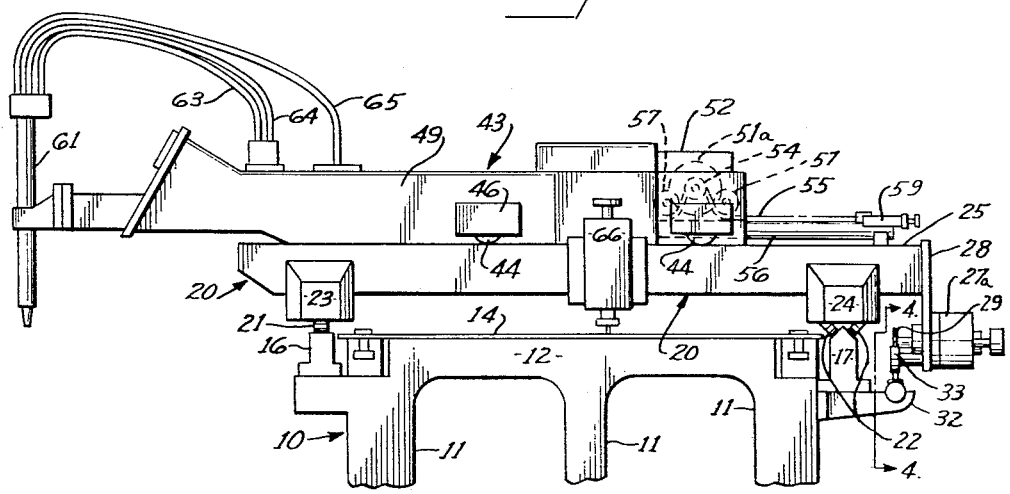
FIGURE 2 is an end elevation of the apparatus shown in FIGURE 1.
Figure 3:
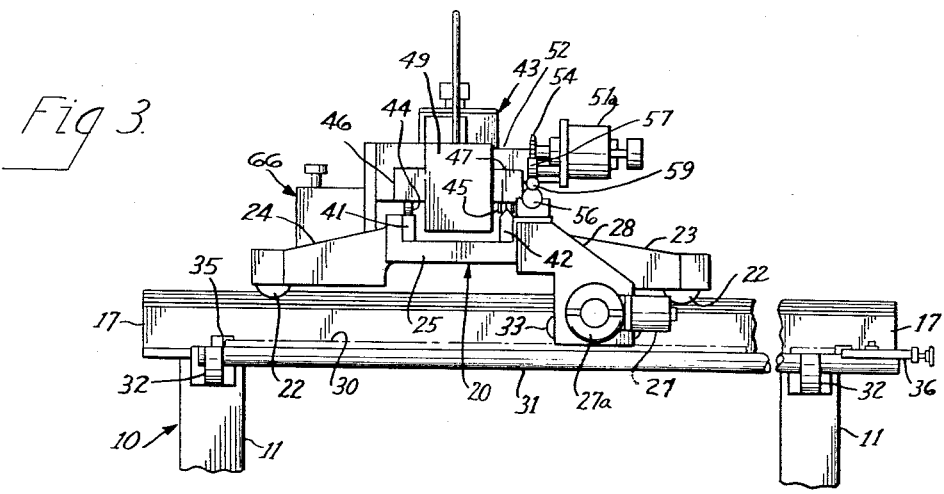
FIGURE 3 is a side elevation of the apparatus shown in FIGURE 1.

*General arrangement.*—The general arrangement of a suitable apparatus to which my invention may be applied is illustrated in FIGURES 1, 2, 3 and 4. As shown in those figures, the invention may be adapted readily to a flame cutting machine of well-known construction and embodying a main longitudinally extending frame structure indicated in general at 10. The frame structure is supported by vertical members 11 which are shown fragmentarily in FIGURE 2; these carry a horizontal portion 12 on which a pattern support 14 is mounted. The main supporting structure also carries main frame rails 16 and 17 which extend longitudinally of the main frame in what is referred to herein as the north-south direction. Only a portion of the length of the main supporting structure 10 and rails 16 and 17 is shown in FIGURE 1; these elements may be as long as is required to accommodate the nature of the work to be performed.

A movable sub-frame indicated in general at 20 is supported on the main frame 10 by rollers 21 that engage the flat upper surface of track 16 and rollers 22 that engage the V-shaped upper surface of track 17. The rollers are carried beneath the ends of the legs 23 and 24, respectively, which support the central portion 25 of the movable sub-frame.

Figure 4:
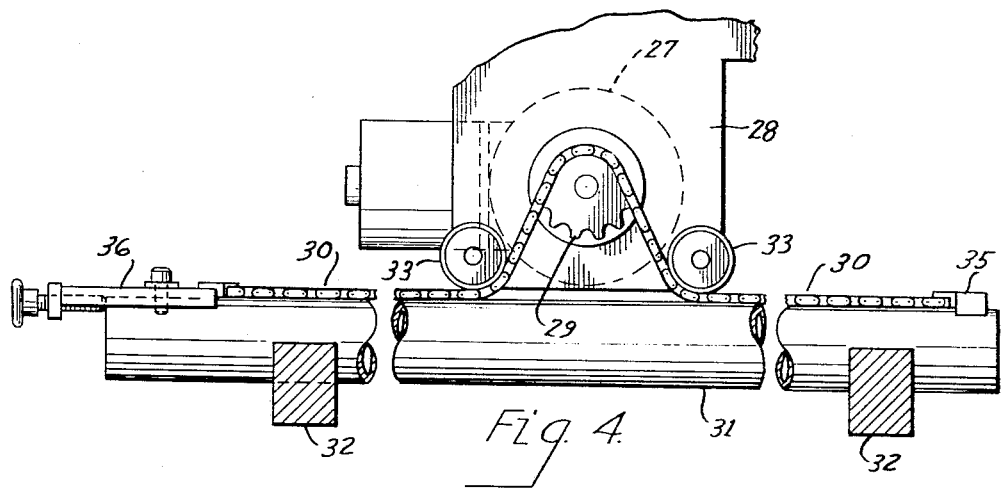
FIGURE 4 is an enlarged detail showing the manner in which the motors are preferably connected to drive the carriage in the desired path.

In order to move the sub-frame on the main frame in north-south directions, a north-south drive motor 27 and a reduction gear 27a are mounted on a bracket 28 depending from one end of the central portion 25 of the movable sub-frame. The output shaft of reduction gear 27a carries a sprocket 29 which engages a chain 30 that is supported by a longitudinally extending member 31 carried by brackets 32 supported on the main frame. The chain is guided beneath idlers 33 and over sprocket 29 as shown in FIGURE 4, and the ends of the chain are secured to the ends of the supporting member 31 as indicated at 35 and 36. The connection 36 is preferably adjustable so that proper tension can be maintained in the chain. Thus rotation of the motor 27 in one direction will cause the movable sub-frame to move to the north; and in the opposite direction, will cause the movable sub-frame to move to the south. The motor is controlled in accordance with signals derived from the tracer as described below.

In order to provide for the east-west component of the motion of the tracer, the movable sub-frame 20 carries rails 41 and 42 which extend in the east-west direction; i.e., transversely of the main frame and the rails 16 and 17. A carriage indicated in general at 43 is supported for movement on the rails 41 and 42 by wheels 44 that engage the flat top of rail 41 and wheels 45 that engage the V-shaped top of rail 42. These wheels are carried by brackets 46 and 47, respectively, which project from the sides of the central frame member 49 of the carriage 43.

Carriage 43 is driven in the east-west directions by the east-west motor 51, which with reduction gear 51a is supported by a bracket 52 secured to the central frame member 49 of the carriage. The driving mechanism for the carriage preferably is identical with that described previously for the north-south drive and shown in FIGURE 4; the driving mechanism comprises a sprocket 54 on the shaft of reduction gear 51a, a chain 55 supported by member 56 carried on the movable sub-frame 20, and idlers 57 which guide the chain around the sprocket 54. One end of the chain is fixed as indicated at 58; the other end of the chain is secured to the member 56 by an adjustable connection shown at 59 similar to the adjustable connection 36 provided for the chain 30. Power is supplied to motors 27 and 51 through appropriate flexible cables, not shown.

The central frame member of carriage 43 carries a torch 61, at the end thereof remote from motor 51. The torch may be of conventional construction and is supplied with the required gases in conventional fashion through flexible conduits 63, 64 and 65. The work may be supported in a conventional manner beneath the torch 61. The carriage 43 also has fixed to it a tracer mechanism indicated in general at 66 which, through electrical circuits described below, produces electrical signals which are amplified and caused to control the motors 27 and 51 so as to drive the sub-frame in the north-south directions on the main support and the carriage in the east-west directions on the sub-frame at the speeds and in the directions required to cause the tracer mechanism to follow a pattern carried on the pattern support at the desired speed. The torch necessarily follows a path identical with the path of the tracer mechanism and therefore reproduces the contour of the pattern.

Figure 5:
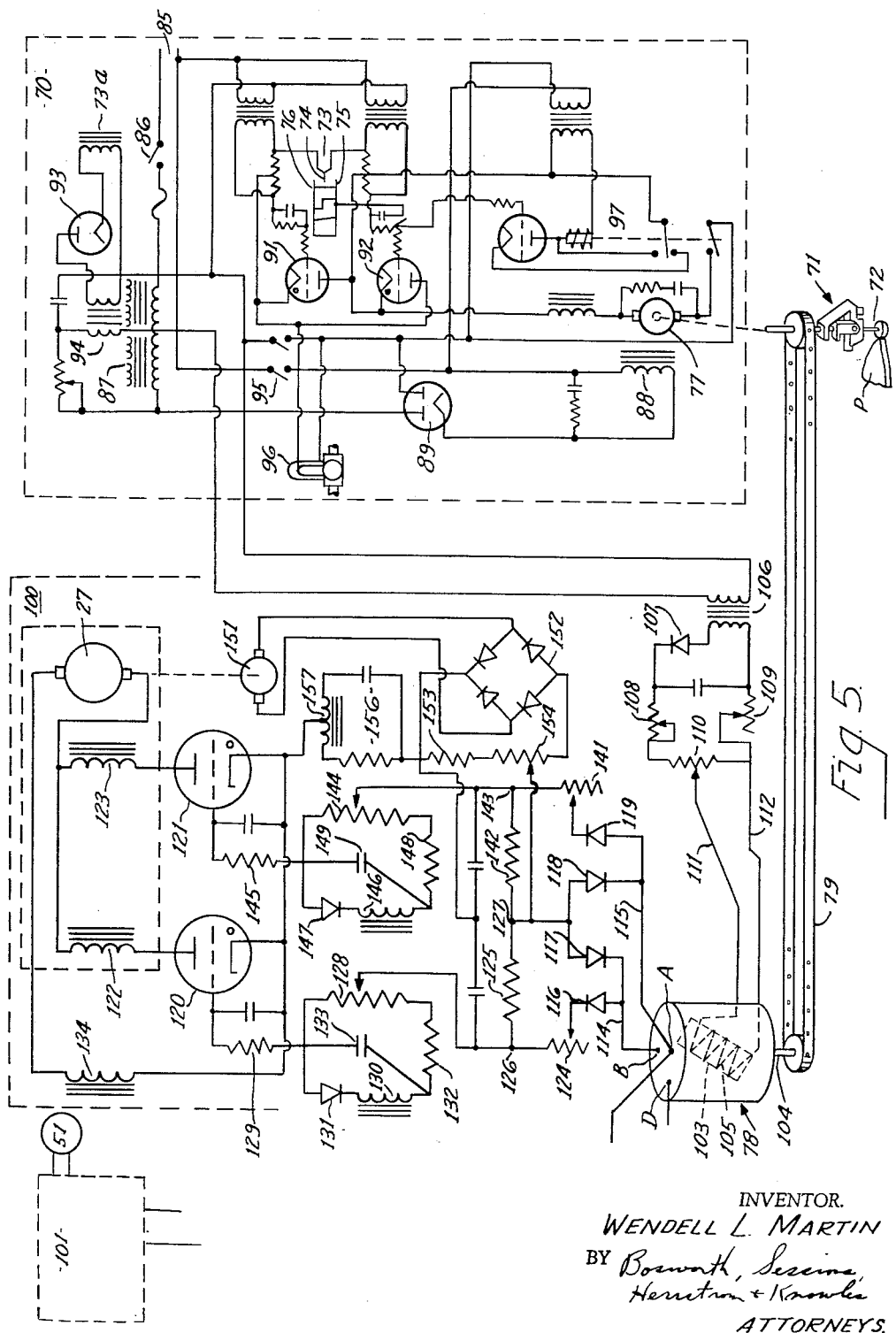
FIGURE 5 is a wiring diagram of a preferred electrical circuit.

*Pattern following apparatus.*—The pattern following apparatus includes the tracer mechanisms 66 and the electrical circuits indicated in general at 70 in FIGURE 5. These elements are preferably substantially identical to corresponding components shown in my said Patent No. 2,678,496, to which reference is made for a more detailed description. However, those skilled in the art will appreciate that other pattern following devices, for example, photocell tracers can be employed so long as a steering signal is produced that can be utilized to control a resolver such as a sine-cosine generator. As described below, the resolver provides the sine and cosine components that are utilized to operate the north-south motor 27 and the east-west motor 51.

In the preferred form, the pattern following apparatus includes a tracer head 71 constructed in the manner disclosed in detail in my said Patent No. 2,678,496 and embodying a tracer 72 that engages the edge of a pattern P. The tracer 72 is mounted for rocking movement with respect to the tracer head 71. The tracer head incorporates a vibrator indicated diagrammatically at 73, and rocking movement of the tracer changes the relationship between the contacts of the vibrator. The control circuit is so arranged that when the engagement between the pattern P and the tracer 72 is such as to rock the tracer in a counterclockwise direction as shown in FIGURE 5, then contacts carried by the reed 74 of vibrator 73 engage the lower contact 75 earlier in each cycle of vibration than they engage the upper contact 76. This energizes the steering motor 77 to turn the tracer head 71 and tracer 72 away from the center of the pattern, the tracer head being mounted on the shaft of the steering motor. A sine-cosine generator 78 is correspondingly turned by positive drive by belt 79. Rotation of the resolver, through circuits to be described below, results in controlling the north-south and east-west motors 27 and 51 so that the tracer is driven in the desired direction, the tracer head is returned to its normal position and contacts 75 and 76 return to their normal position with respect to the reed 74.

When the tracer 72 moves away from the pattern so that the tracer 71 is rotated in a clockwise direction, the upper contact 76 is moved closer to the reed, the steering motor is energized to steer the tracer head in the opposite direction and to control the resolver so that the motors 27 and 51 drive the carriage in the desired direction to bring the tracer back to the neutral position. The action of the control is such that connecting impulses are supplied to the steering motor at very short intervals of time so that the shaft of the steering motor at all times is maintained in a substantially constant angular relationship to the pattern that is then engaged by the tracer, and the tracer and the resolver are also maintained in the same angular relationship. Stated in another way, a given diameter of the shaft of the steering motor, the tracer and the resolver are, at any given instant, pointed in substantially the direction that is required to cause the tracer to follow the pattern.

The circuit for controlling the steering motor includes A.C. power supply lines 85, off-on switch 86, and transformer 87 which supplies full wave rectified D.C. to the field 88 of the steering motor 77 through the rectifier tube 89. The armature of the steering motor is supplied with current through thyratrons 91 and 92. The thyratrons are connected in inverse parallel so that when thyratron 91 is conductive, the direction of current flow through the armature of motor 77 is opposite to that when thyratron 92 is conductive, but the energization of the field remains the same. Thus, the direction of rotation of the armature of the steering motor is determined by which thyratron energizes the armature and the power supplied to the steering motor is dependent upon the points in the positive half cycles of plate current applied to the respective thyratrons at which they become conductive. The firing of the thyratrons is controlled through the vibrator by the amount the tracer 72 is moved from its neutral or null position. The action of the control is very smooth because the correcting impulses are proportional to the displacement of the tracer from the null position.

The coil 73a of vibrator 73 is energized by a half-wave rectifier 93 which is supplied with current from transformer 94. The apparatus is also preferably provided with starting and speed controls as disclosed in my said patent, including a start-stop switch 95, a solenoid valve 96 which controls the high pressure oxygen supplied to the torch, and a relay 97.

Figure 6:
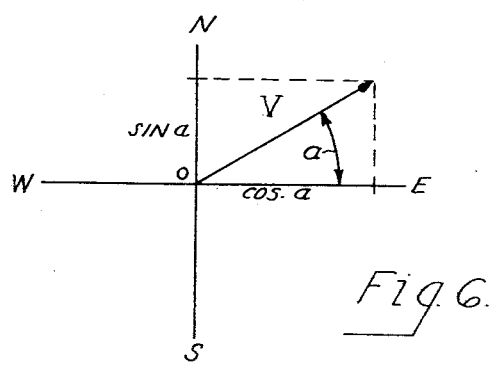
FIGURE 6 is a vector diagram illustrating the principle of operation of the apparatus, and FIGURE 7 diagrammatically illustrates the voltage relationships in the control of one of the driving motors.

*Controls for driving motors.*—In my said Patent No. 2,678,496 a circuit substantially as shown herein controls the operation of a steering motor that steers the drive wheel that propels the tracer around the pattern. According to the present invention, the steering motions of the steering motor are applied to the resolver 78, and the signals obtained from the resolver are utilized through the circuits shown in general at 100 and 101 to operate the north-south motor 27 and east-west motor 51. The basic principle of operation of the apparatus will be evident from the diagram constituting FIGURE 6. If the vector V represents the speed and direction of movement at which it is desired to drive the tracer at any given instant, then the north-south component of the vector V is the sine of angle $a$; while the east, west component of the vector is the cosine of the angle. If the north-south motor is driven in the proper direction at a speed proportional to the sine component and the east-west motor is driven in the proper direction at a speed proportional to the cosine component, then the tracer will follow the desired path at the desired speed.

It will be noted that not only the values but the directions of these components change as the direction of the vector rotates through 360°. The sine component is positive for all positions of the vector north of the east-west axis and negative for all positions south of the east-west axis; the cosine component is positive for all positions east of the north-south axis and negative for all positions west of the north-south axis. The resolver 78 and its associated circuits 100 and 101 recognize this and drive the motors 27 and 51 in the proper directions and at the proper speeds for all positions of the vector.

Any appropriate type of sine-cosine generator may be utilized as the resolver 78. In the drawing the resolver 78 is shown diagrammatically as being of a known construction comprising a rotatable card 103 mounted on a shaft 104 and rotated by the steering motor and belt 79 so that the long axis of the card is always substantially parallel to the direction required to cause the tracer to follow the pattern. The card is wound with a coil 105 consisting of many closely spaced turns of fine wire and is supplied with an energizing voltage through the transformer 106, half wave rectifier 107 and adjusting potentiometers 108 and 109, and speed control potentiometer 110. The output of the rectifier is connected to the card through conductors 111 and 112 and appropriate brushes and slip rings, not shown.

The output of the resolver is derived from a terminal A which is connected to a brush that engages the center of coil 105 and output terminals B and D which are connected to brushes disposed 90° apart with relation to the center of rotation of the card 103, the voltage across terminals A—B constituting the sine component of the output of the resolver and the voltage across terminals A—D constituting the cosine component. Thus, the output of the resolver depends upon the position given the card 103 by the steering motor. As explained above, the shaft of the steering motor maintains itself and the tracer in substantially constant angular relationship to the pattern P through the circuits previously described and illustrated in general at 70. Through this action, the card takes a position substantially parallel to a tangent to the pattern, which is the direction required to cause the tracer to follow the pattern. This position corresponds to the direction of vector V of FIGURE 6, so that the sine and cosine outputs of the resolver are functional of north-south and east-west components of the vector V; i.e., of the desired speed and direction of the tracer.

In order to drive the tracer, the carriage 43 and the torch 61 at the desired speed and in the desired path as determined by the pattern, the sine output of the resolver is utilized to control the operation of the north-south motor 27 through the circuit shown in general at 100, while the cosine output is utilized to control the operation of the east-west motor 51 through the circuit indicated in general at 101. Since these circuits are identical, only the circuit 100 will be described in detail, the same reference characters being applied to the components in the circuit 101.

In order to operate the north-south drive motor 27 at the desired rate of speed and in the desired direction, the sine output terminals AB of the resolver are connected through conductors 114 and 115 to the four half wave rectifiers 116, 117, 118, 119. These rectifiers sense the polarity of the control signal and energize the grid circuits of the thyratrons 120 and 121 which supply current to the fields 122 and 123 of the motor 27, the arrangement being such that the motor is driven in the north direction when field 122 is energized and in the south direction when field 123 is energized. Assume, for example, that terminal B of the resolver is positive with respect to terminal A because of the position taken by the card 103 and coil 105 in response to the movement of the steering motor. Then the only direction for current to flow is through rectifier 116, trimmer resistor 124, resistor 125, rectifier 118 and back to point A. The voltage appearing between points 126 and 127 across resistor 125 is proportional to the voltage AB and becomes the firing voltage for the thyratron 120. This voltage is supplied to the thyratron by a circuit including potentiometer 128 and resistor 129. A bias voltage for holding the thyratron non-conductive in the absence of a positive voltage at B is provided by transformer secondary 130, silicon diode 131, resistor 132, and condenser 133. Current is supplied to the motor 27 through the transformer secondary 134, one side of which is connected to the armature of the motor and thence through the fields 122 and 123 to the plates of thyratrons 120 and 121, while the other side of the secondary 134 is connected to the cathodes of the thyratrons 120 and 121. With this arrangement, it will be evident that a voltage to fire thyratron 120 will be present only when point B is positive with respect to point A of the resolver; and the point in each positive half cycle of plate current applied to the thyratron 120 at which the thyratron becomes conductive depends on the amplitude of the positive voltage at B. Thus, a positive voltage at B energizes field 122 of the motor and drives the motor to move the carriage in the north direction.

On the other hand, if B is negative with respect to A, then the only path for current to flow is through rectifier 119, variable resistor 141, resistor 142 and rectifier 117 to B. The voltage drop across resistor 142 provides the firing voltage for thyratron 121, the voltage at point 143 being applied to the grid of thyratron 121 through potentiometer 144 and resistor 145, the bias voltage being supplied by the transformer secondary 146, diode 147, resistor 148, and condenser 149. The circuits for the two thyratrons 120 and 121 are substantially identical. When B is negative with respect to A, thyratron 121 is caused to fire, thereby energizing the motor through field 123 and causing the motor to drive the sub-frame in the south direction. While thyratron 121 is firing, thyratron 120 is held non-conductive by the bias voltage supplied to the grid.

In order to control the speed of the north-south motor 27 so that it will be proportional to the sine voltage output of the resolver 78, that is, proportional to the voltage B—A, a tachometer generator 151 is mounted on the shaft of the motor 27. The output of this generator is fed to a full wave rectifier 152 which is necessary to maintain a constant polarity of the generator output inasmuch as the voltage at the generator brushes necessarily reverses when the direction of rotation of the motor 27 reverses. The output of the rectifier 152 is connected across the generator load resistors 153 and 154. The voltage across the load resistors is connected in opposition to the grid control voltage from the resolver 78, so the north-south drive motor 27 is required to drive the tachometer generator 151 at a speed that will generate a voltage substantially equal to the voltage AB constituting the sine output of the resolver. A small A.C. voltage lagging about 90° is introduced in the grid-cathode circuits of the thyratrons by the phase shift network 156, the network being supplied by transformer secondary 157. This gives a smooth throttling control of the conduction of the thyratrons 120 and 121 as the level of the grid voltage is changed by variations in output of the tachometer generator and resolver.

Figure 7:
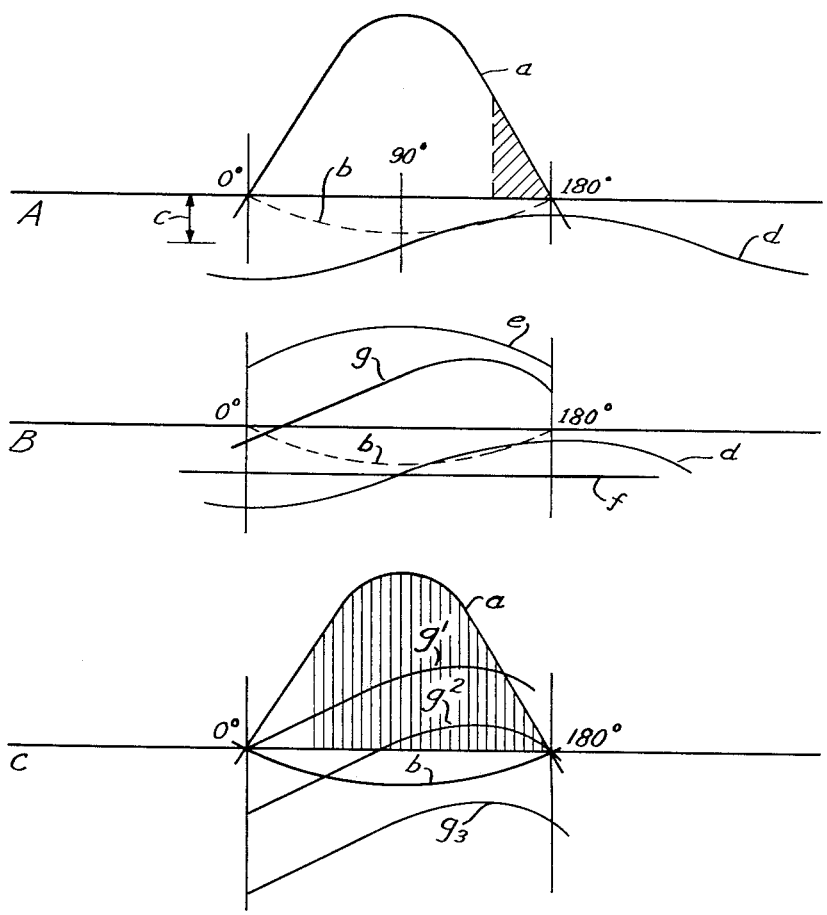

The diagrams constituting FIGURE 7 illustrate the relationship of the voltages in the circuit. Diagram A shows the fixed voltages. Voltage $a$ indicates the plate voltage on one of the thyratrons 120 or 121 during a conductive half cycle; $b$ is the critical grid voltage of the thyratrons; $c$ indicates the amount of negative grid bias; and voltage $d$ is the lagging voltage produced by the phase shift network 156, as modified by the grid bias. In the diagram shown, the magnitude of the grid bias and the phase shifted voltage $d$ are such that, in the absence of other factors, the tube would fire during the latter part of the positive half cycle, the period of conduction being indicated by the shaded area under the curve $a$.

Diagram B shows the voltage $e$ which constitutes the output of the resolver; it will be noted that this voltage has a substantial A.C. ripple because the resolver input is produced by a half wave rectifier. The level of the resolver output varies with the angle of the coil 105 as determined by the steering motor and also may be adjusted by means of the control 110 which controls the input level to the resolver. Curve $f$ of diagram B is the output of the tachometer generator. The level of this varies with the speed of the motor 27. Curve $g$ represents the resultant of the resolver output, the phase retarded voltage $d$, and the tachometer voltage $f$. This resultant voltage may be considered as the voltage that controls the firing of the thyratron, and for any given input to the resolver and any given grid bias, its level depends upon the position of the resolver and the output of the tachometer generator 151, which in turn depends upon the motor speed.

Diagram C shows typical variations in level of the curve $g$. In curve $g_1$ the resolver output as modified by the grid bias and the phase retarded voltage $d$ is greater than the voltage of the tachometer generator so that the tube conducts throughout substantially the entire positive half cycle. In curve $g_2$, the output of the tachometer generator has reduced the level of the voltage $g$ to adjust the speed of the motor to the demand signal given by the resolver. Here the tube conducts during the portion of the half cycle indicated by the shaded area under the curve $a$. In curve $g_3$ the voltage $g$ has been reduced by an increased tachometer voltage so that the tube no longer fires.

It is evident then that the motor operates at a speed determined by balancing the tachometer output against the output of the resolver; hence, the motor speed will be functional of the output of the resolver and, therefore, in the present example, functional of the sine of the vector that represents the desired direction and velocity of the tracer.

The circuit 101 operates in the same manner as the circuit 100 but senses the cosine component of the vector and drives the motor 51 which causes the carriage 43 to move in the east-west directions on the sub-frame 20. The resultant of the motions imparted to the tracer by the movement of the sub-frame on the main frame and the motion of the carriage on the sub-frame is the motion that is required to cause the tracer to follow the pattern P at the desired speed.

*Summary of operation.*—The action of the tracer head 71 and circuits indicated at 70 is to control the steering motor so that a given diameter of the shaft of the steering motor at all times has a substantially constant angular relationship to the pattern being traced. In other words, the shaft is turned by the steering motor so that one particular diameter of the shaft is always substantially parallel to a tangent to the pattern at the point where the tracer touches the pattern, this being the desired direction of movement; the tracer 72 is always pointed in substantially the desired direction of movement and is maintained in a substantially constant relationship to the edge of the pattern. Through the belt 79, the motion of the steering motor is utilized to control the resolver so that the position of the coil 105 of the resolver also is maintained in a substantially constant angular relationship with respect to the pattern being traced; in the present example, the axis of the coil 105 of the resolver may be maintained at all times substantially parallel to a tangent to the pattern at the point where the tracer 72 engages the pattern. Thus, the axis of the coil is always aligned with the direction in which it is desired to have the tracer as a whole move.

The resolver 78 resolves the input to it into sine and cosine components which are utilized through the circuits 100 and 101 to drive the north-south motor 27 and the east-west motor 51. These motors, through positive drive mechanisms including the sprockets and chains 29 and 30 and 54 and 55, drive the carriage carrying the tracer head and torch in the north-south and east-west directions, respectively; the resultant of these motions carries the tracer around the pattern and the torch takes a corresponding path. The speed of operation of the individual motors is controlled by the output of the resolver, balanced by the tachometer generators associated with each motor. The lineal speed of the tracer in its path is controlled by adjusting the input to the resolver through the potentiometer 110, the lineal speed being the resultant of the speeds of the motors 27 and 51.

In operation, the apparatus is able accurately to trace patterns involving straight lines, curves, sharp corners, and reverse bends at substantially constant lineal speeds as determined by the setting of the potentiometer 110 in the resolver input. Stability and consequent smoothness in the final driving motion is secured following drastic changes in speed of the individual driving motors by the viscous damping function contributed by the reduction gearing which is enclosed in a bath of heavy lubricant. This reduction gearing is a single worm gear reduction of large ratio. The torque represented by the viscous friction load of this gearing is substantially equal to the torque representing the stored energy in the associated drive motor armature. This prevents over-shoot in tracing sharp turns and small radii in the useful range of cutting speeds.

The drive mechanism does not involve any frictional engagement with the pattern itself and is arranged so that the movements of the carriage are obtained through positive drive components so that there is no slippage or wear in the driving mechanism. For this reason, massive apparatus can be driven accurately at high cutting speeds. While a preferred form of tracer is shown in the drawings, it is to be understood that any type of tracing mechanism, including manual means, that will properly position the resolver may be employed in carrying out the apparatus. The resolver electrically resolves the vector representing the desired speed and direction of the tracer into sine and cosine components, and these components are used to control the north-south and east-west driving motors.

Those skilled in the art will appreciate that various changes and modifications can be made in the apparatus without departing from the spirit and scope of the invention. Therefore, it is to be understood that the foregoing description is given as an example of a preferred form of the invention. The scope of the invention is defined by the appended claims.

I claim:

1. In a contour reproducing apparatus, a carriage mounted for movement in any direction in a plane, means for driving said carriage along a desired path, said means comprising steering means for determining the desired direction of movement of said carriage, a sine-cosine generator controlled by said steering means for providing a voltage functional of the sine of the angle between the desired direction of travel of said carriage and a fixed axis and another voltage functional of the cosine of said angle, said sine-cosine generator having a single input, an electric motor for driving said carriage in directions parallel with said axis, another electric motor for driving said carriage in directions at right angles to said axis and electric circuit means associated with each of said motors for driving said motors at speeds directly proportional to said sine and cosine voltages, each of said electric circuit means comprising two electronic control devices each having a control electrode, connections between the associated electric motor and the electronic control devices whereby the motor is energized to rotate in one direction when one of the electronic control devices conducts and is energized to operate in the opposite direction when the other electronic control device conducts, rectifier means in circuit with the output of said sine-cosine generator for sensing the polarity of the output of said sine-cosine generator, and connections from said rectifier means to the control electrodes of said electronic control devices whereby a control voltage is supplied to the control electrode of one of the devices when the output of the sine-cosine generator is of one polarity and to the control electrode of the other device when the output is of the opposite polarity.

2. In a contour reproducing apparatus, a carriage mounted for movement in any direction in a plane, means for driving said carriage along a desired path, said means comprising steering means for determining the desired direction of movement of said carriage, a sine-cosine generator for providing a voltage functional of the sine of the angle between the desired direction of travel of said carriage and a fixed axis and another voltage functional of the cosine of said angle, the input to said sine-cosine generator being independent of the desired direction of movement of the carriage, an electric motor for driving said carriage in directions parallel with said axis, another electric motor for driving said carriage in directions at right angles to said axis and electric circuit means associated with each of said motors for driving said motors in accordance with said sine and cosine voltages, each of said electric circuit means comprising two thyratrons, connections between the associated electric motor and the thyratrons whereby the motor is energized to rotate in one direction when one of the thyratrons conducts and is energized to operate in the opposite direction when the other thyratron conducts, rectifier means in circuit with the output of said sine-cosine generator for sensing the polarity of the output of said since-cosine generator, connections from said rectifier means to the grids of said thyratrons whereby a control voltage is supplied to the grid of one of the thyratrons when the output of the sine-cosine generator is of one polarity and to the grid of the other thyratron when the output is of the opposite polarity, a tachometer generator driven by the motor and circuit means for introducing the tachometer generator output into the grid-cathode circuits of the thyratrons in opposition to the output of the sine-cosine generator whereby the speed of the motor is controlled in accordance with the voltage output of the sine-cosine generator.

3. In a contour reproducing apparatus, a carriage mounted for movement in any direction in a plane, means for driving said carriage along a desired path, said means comprising steering means for determining the desired direction of movement of said carriage, a sine-cosine generator for providing a voltage functional only of the input voltage supplied to the generator and the sine of the angle between the desired direction of travel of said carriage and a fixed axis and another voltage functional only of the input voltage supplied to the generator and the cosine of said angle, an electric motor for driving said carriage in directions parallel with said axis, another electric motor for driving said carriage in directions at right angles to said axis and electric circuit means associated with each of said motors for driving said motors in accordance with said sine and cosine voltages, each of said electric circuit means comprising two thyratrons, connections between the associated electric motor and the thyratrons whereby the motor is energized to rotate in one direction when one of the thyratrons conducts and is energized to operate in the opposite directions when the other thyratron conducts, means in circuit with the output of said sine-cosine generator and the grids of the thyratrons whereby a control voltage is supplied to the grid of one of the thyratrons when the output of the sine-cosine generator is of one polarity and to the grid of the other thyratron when the output is of the opposite polarity, means for introducing a voltage functional of the speed of the motor into the grid-cathode circuits of the thyratrons in opposition to the output of the sine-cosine generator, means for supplying a single input voltage to said sine-cosine generator, and means for adjusting the value of said input voltage.

4. In a contour reproducing apparatus, a carriage mounted for movement in any direction in a plane, means for driving said carriage along a desired path, said means comprising steering means for determining the desired direction of movement of said carriage, a sine-cosine generator for providing a voltage functional only of the input voltage supplied to the generator and the sine of the angle between the desired direction of travel of said carriage and a fixed axis and another voltage functional only of the input voltage supplied to the generator and the cosine of said angle, an electric motor for driving said carriage in directions parallel with said axis, another electric motor for driving said carriage in directions at right angles to said axis and electric circuit means associated with each of said motors for driving said motors in accordance with said voltages, each of said electric circuit means comprising two thyratrons, connections between the associated electric motor and the thyratrons whereby the motor is energized to rotate in one direction when one of the thyratrons conducts and is energized to operate in the opposite directions when the other thyratron conducts, rectifier means in circuit with the output of said sine-cosine generator for sensing the polarity of the output of said sine-cosine generator, connections from said rectifier means to the grids of said thyratrons whereby a control voltage is supplied to the grid of one of the thyratrons when the output of the sine-cosine generator is of one polarity and to the grid of the other thyratron when the output is of the opposite polarity, circuit means for supplying a negative bias to the grids, a phase-shift network for supplying a lagging alternating voltage to the grid circuits of the thyratrons, a tachometer generator driven by the motor, circuit means including a rectifier for introducing the tachometer generator output into the grid-cathode circuits of the thyratrons in opposition to the output of the sine-cosine generator whereby the speed of the motor is controlled in accordance with the voltage output of the sine-cosine generator, means for exciting said sine-cosine generator with a single input voltage having an A.-C. ripple, and means for adjusting the value of said exciting voltage.

5. In a contour reproducing apparatus, a main frame, a pattern support carried thereby, a sub-frame movable along the main frame in a straight line, a carriage mounted on the sub-frame and movable thereon in a straight line in directions transverse to the movement of the sub-frame along the main frame whereby movements of the carriage on said sub-frame and of said sub-frame on said main frame enable the carriage to move over said pattern support in all directions, means for driving said carriage along a path determined by a contour carried by said pattern support, said means comprising a tracer arranged to follow said contour, a steering motor, a mechanical connection between said steering motor and said tracer, electric circuit means controlled by the relationship between said tracer and said pattern for controlling said steering motor to maintain a substantially constant angular relationship between said pattern and said tracer, electric circuit means controlled solely by said steering motor for providing a voltage functional of the sine of the desired direction of travel of said tracer and another voltage functional of the cosine of the desired direction of travel of said tracer, an electric motor and electric circuit means for driving said sub-frame at a speed directly proportional to one of said voltages, an electric motor and electric circuit means for driving said carriage on said sub-frame at a speed directly proportional to the other of said voltages, said electric circuit means controlled by said steering motor having only one input, and adjustable means for varying said input and thereby controlling the resultant speed of said carriage.

6. A contour reproducing apparatus having a main frame, a pattern support carried thereby, a sub-frame movable therealong in a straight line, a carriage mounted on the sub-frame and movable thereon in directions transverse to the movement of the sub-frame along the main frame whereby movements of the carriage on said sub-frame and of said sub-frame on said main frame enable the carriage to move over said pattern support in any direction, a motor mounted on said sub-frame for driving said sub-frame along said main frame, a positive driving connection between said motor and said main frame, a second motor mounted on said carriage for driving said carriage along said sub-frame, a positive driving connection between said second motor and said sub-frame, a tracer arranged to follow said contour, and means controlled by the position of said tracer with respect to said contour for controlling said driving motors to drive said tracer and said carriage to cause said tracer to follow said contour, said control means including means associated with said tracer for producing a signal in response to deviations of said tracer from said contour, a steering motor rotatable in response to said signal in directions to restore said tracer to the proper relationship with said contour, and a sine-cosine generator controlled solely by said steering motor and adapted to produce an output functional of the sine of the angle between a diameter of said steering motor and a fixed axis and another voltage functional of the cosine of said angle, said sine-cosine generator having one input, and electric circuit means for driving one of said driving motors at a speed proportional to said sine voltage and the other of said driving motors at a speed proportional to said cosine voltage, and means for adjusting the input to said sine-cosine generator to thereby control the resultant speed of the carriage.

7. A contour reproducing apparatus having a main frame, a pattern support carried thereby, a sub-frame movable therealong in a straight line, a carriage mounted on the sub-frame and movable thereon in directions transverse to the movement of the sub-frame along the main frame whereby movements of the carriage on said sub-frame and of said sub-frame on said main frame enable the carriage to move over said pattern support in any direction, a motor for driving said sub-frame along said main frame, a second motor for driving said carriage along said sub-frame, a tracer arranged to follow said contour, and means controlled by said tracer and the position of said tracer with respect to said contour for controlling said driving motors to drive said tracer and said carriage to cause said tracer to follow said contour, said control means including means associated with said tracer for producing a signal in response to deviations of said tracer from said contour, a steering motor rotatable in response to said signal in directions to restore said tracer to the proper relationship with said contour, and a sine-cosine generator controlled solely by said steering motor and adapted to produce an output functional of the sine of the angle between a diameter of said steering motor and a fixed line of reference and another voltage functional of the cosine of said angle, said sine-cosine generator having only one input, and electric circuit means for driving one of said driving motors at a speed proportional to said sine voltage and the other of said driving motors at a speed proportional to said cosine voltage, said electric circuit means including feedback means for maintaining the speeds of said motors proportional to the respective sine and cosine voltages.

8. In a contour reproducing apparatus, a carriage mounted for movement in any direction in a plane, means for driving said carriage along a desired path, said means comprising steering means for determining the desired direction of movement of said carriage, a sine-cosine generator controlled by said steering means for providing a control voltage functional only of the input to the generator and the sine of the angle between the desired direction of travel of said carriage and a fixed axis and another control voltage functional only of the input to the generator and the cosine of said angle, the input to said sine-cosine generator being independent of the position of said carriage, an electric motor for driving said carriage in directions parallel with said axis, a power supply for said motor, circuit means for controlling said power supply to drive said motor at a speed proportional to one of said control voltages, another electric motor for driving said carriage in directions at right angles to said axis, another power supply for said other motor, and other circuit means for controlling said other power supply to drive said other motor at a speed proportional to the other of said control voltages.

9. In a contour reproducing apparatus, a carriage mounted for movement in any direction in a plane, means for driving said carriage along a desired path, said means comprising steering means for determining the desired direction of movement of said carriage, a sine-cosine generator controlled solely by rotation of an element thereof by said steering means for providing a control voltage functional of the sine of the angle between the desired direction of travel of said carriage and a fixed axis and another control voltage functional of the cosine of said angle, the input to said sine-cosine generator being independent of the position of said carriage, an electric motor for driving said carriage in directions parallel with said axis, a power supply for said motor, circuit means for controlling said power supply to drive said motor at a speed proportional to one of said control voltages, another electric motor for driving said carriage in directions at right angles to said axis, another power supply for said other motor, and other circuit means for controlling said other power supply to drive said other motor at a speed proportional to the other of said control voltages, and means for controlling the input to said sine-cosine generator and thereby controlling the resultant speed of the carriage.

References Cited in the file of this patent
UNITED STATES PATENTS

| | | |
|---|---|---|
| 2,269,643 | Bechtle et al. | Jan. 13, 1942 |
| 2,334,301 | Young | Nov. 16, 1943 |
| 2,397,933 | Fowle et al. | Apr. 9, 1946 |
| 2,499,178 | Berry et al. | Feb. 28, 1950 |
| 2,508,468 | Rathje | May 23, 1950 |
| 2,608,907 | Ivins et al. | Sept. 2, 1952 |
| 2,678,496 | Martin | May 18, 1954 |
| 2,679,620 | Berry | May 25, 1954 |